US012800827B2

(12) United States Patent
Ou Yang et al.

(10) Patent No.: US 12,800,827 B2
(45) Date of Patent: Nov. 17, 2026

(54) OPTICAL MODULE PACKAGING STRUCTURE

(71) Applicant: INDUSTRIAL TECHNOLOGY RESEARCH INSTITUTE, Hsinchu (TW)

(72) Inventors: Tsung-Yu Ou Yang, New Taipei City (TW); Hsiang-Hung Chang, Hsinchu County (TW); Chin-Hung Wang, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 297 days.

(21) Appl. No.: 18/629,833

(22) Filed: Apr. 8, 2024

(65) Prior Publication Data

US 2025/0244526 A1 Jul. 31, 2025

(30) Foreign Application Priority Data

Jan. 29, 2024 (TW) ................................ 113103379

(51) Int. Cl.
*G02B 6/12* (2006.01)
*G02B 6/42* (2006.01)

(52) U.S. Cl.
CPC ....... *G02B 6/12002* (2013.01); *G02B 6/4279* (2013.01)

(58) Field of Classification Search
CPC .. G02B 6/4245; G02B 6/4246; G02B 6/4255; G02B 6/4274; G02B 6/4279; H10W 90/401; H10W 90/295; H10W 90/297; H10W 90/701; H10W 90/724
USPC ........................................................ 385/14, 88
See application file for complete search history.

(56) References Cited

U.S. PATENT DOCUMENTS

| | | | | |
|---|---|---|---|---|
| 11,233,039 | B2 * | 1/2022 | Yang ................... | H10W 70/614 |
| 2019/0333905 | A1 * | 10/2019 | Raghunathan ....... | G02B 6/4266 |
| 2023/0121954 | A1 | 4/2023 | Lin et al. | |
| 2023/0221507 | A1 * | 7/2023 | Taha ................... | G02B 6/4214 385/14 |
| 2023/0400649 | A1 | 12/2023 | Lau et al. | |

(Continued)

FOREIGN PATENT DOCUMENTS

| | | |
|---|---|---|
| CN | 113192894 A | 7/2021 |
| TW | 201911503 A | 3/2019 |

(Continued)

OTHER PUBLICATIONS

TW Office Action dated Jan. 10, 2025 in application 113103379.

(Continued)

*Primary Examiner* — Robert Tavlykaev
(74) *Attorney, Agent, or Firm* — Maschoff Brennan

(57) ABSTRACT

The disclosure provides an optical module packaging structure, including a molding compound layer, a photonic integrated circuit, a fan-out redistribution layer, and an electronic integrated circuit. The photonic integrated circuit is disposed in the molding compound layer. The fan-out redistribution layer is disposed on the molding compound layer. The electronic integrated circuit is disposed on the fan-out redistribution layer. The fan-out redistribution layer electrically couples the photonic integrated circuit and the electronic integrated circuit.

10 Claims, 8 Drawing Sheets

(56) References Cited

U.S. PATENT DOCUMENTS

| | | | | |
|---|---|---|---|---|
| 2024/0337799 | A1* | 10/2024 | Ravichandran | G02B 6/428 |
| 2025/0110291 | A1* | 4/2025 | Weng | G02B 6/4206 |

FOREIGN PATENT DOCUMENTS

| | | | |
|---|---|---|---|
| TW | 202202887 | A | 1/2022 |
| TW | 202242463 | A | 11/2022 |
| TW | 202245162 | A | 11/2022 |
| TW | 202323883 | A | 6/2023 |

OTHER PUBLICATIONS

TW Office Action dated Aug. 1, 2025 as received in Application No. 113103379.

TW Notice of Allowance dated Apr. 14, 2026 in application No. 113103379.

* cited by examiner

OPTICAL MODULE PACKAGING STRUCTURE

CROSS-REFERENCE TO RELATED APPLICATIONS

All related applications are incorporated by reference. The present application is based on, and claims priority from, Taiwan (International) Application Serial Number 113103379 filed on Jan. 29, 2024, the disclosure of which is hereby incorporated by reference herein in its entirety.

TECHNICAL FIELD

The disclosure relates to an optical module packaging structure.

BACKGROUND

To meet the demand for the upcoming optical communication systems of high transmission rate, a photonic integrated circuit (PIC) having a smaller size, faster transmission rate and lower cost can realize an optical communication of high transmission rate with low cost. In addition, due to the advantage of compactness, a silicon photonic packaging structure including a photonic integrated circuit and electronic integrated circuit (EIC) draws significant attention.

However, the packaging of the photonic integrated circuit still faces many challenges. For example, signal interference may be caused in the application of high frequency transmission such that the compact configurations of the photonic integrated circuit and the electronic integrated circuit may lead to a higher insertion loss and an obvious RC delay effect.

SUMMARY

One embodiment of this disclosure provides an optical module packaging structure including a molding compound layer, a photonic integrated circuit, a fan-out redistribution layer, and an electronic integrated circuit. The photonic integrated circuit is disposed in the molding compound layer. The fan-out redistribution layer is disposed on the molding compound layer. The electronic integrated circuit is disposed on the fan-out redistribution layer, and the fan-out redistribution layer is electrically coupled to the photonic integrated circuit and the electronic integrated circuit.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
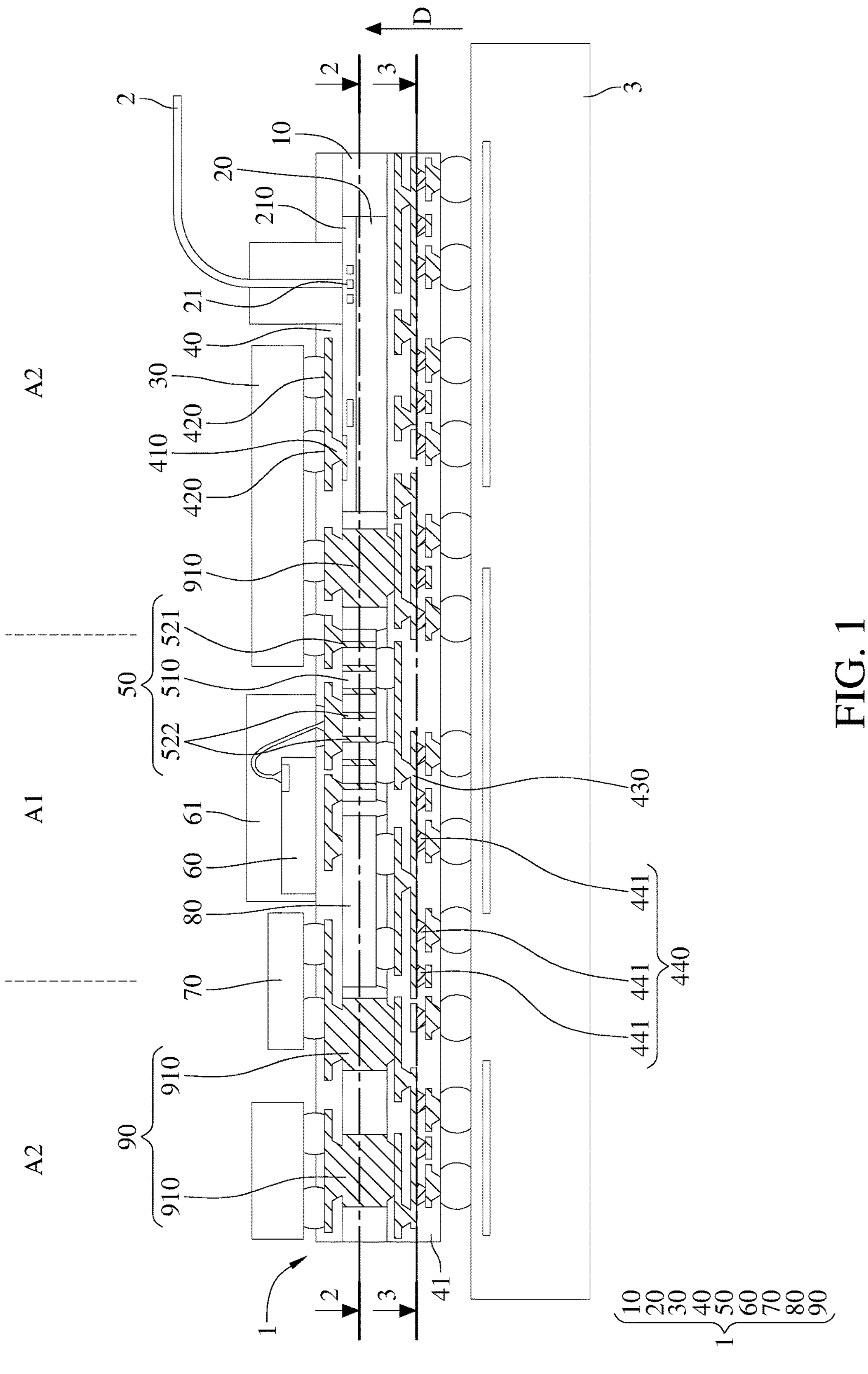
FIG. 1 is a schematic view of an optical module packaging structure according to one embodiment of the disclosure.

In the following detailed description, for purpose of explanation, numerous specific details are outlined to provide a thorough understanding of the disclosed embodiments. It will be apparent, however, that one or more embodiments may be practiced without these specific details. In other instances, well-known structures and devices are schematically shown to simplify the drawing.

Please refer to FIG. 1. FIG. 1 is a schematic view of an optical module packaging structure 1 according to one embodiment of the disclosure. In this embodiment, the optical module packaging structure 1 includes a molding compound layer 10, a photonic integrated circuit 20, an electronic integrated circuit 30, and a fan-out redistribution layer 40.

For example, the molding compound layer 10 is, but not limited to, an epoxy resin layer or a solid molding material layer. The photonic integrated circuit 20 is disposed in the molding compound layer 10. The fan-out redistribution layer 40 is disposed on the molding compound layer 10, and the electronic integrated circuit 30 is disposed on the fan-out redistribution layer 40. Further, one or more optical components (not shown) such as waveguides or optical lenses may be disposed on an active side 210 of the photonic integrated circuit 20. An end surface 21 of an optic fiber 2 may be optically coupled to the active side 210 of the photonic integrated circuit 20, to allow optical signals to be transmitted between the photonic integrated circuit 20 and the optic fiber 2. The active side 210 of the photonic integrated circuit 20 may receive optical signals and convert them into electrical signals to be output. In this embodiment, the photonic integrated circuit 20 further includes a silicon modulator and a waveguided photodetector having at least one passive photonic circuit.

The electronic integrated circuit 30 may include an application-specific integrated circuit (ASIC), such as a receiver or a driver used in an optical communication system. The electronic integrated circuit 30 may further include any one of a transistor, a voltage converter, a digital signal processor (DSP), a transimpedance amplifier (TIA), and a clock data recovery (CDR) circuit. The molding compound layer 10 and the electronic integrated circuit 30 are located on two opposite sides of the fan-out redistribution layer 40, respectively. Further, the fan-out redistribution layer 40 is formed above the molding compound layer 10 and exposes the active side 210 of the photonic integrated circuit 20. The molding compound layer 10 and the electronic integrated circuit 30 are sequentially disposed along a stacking direction D shown in FIG. 1. The electronic integrated circuit 30 partially overlaps the photonic integrated circuit 20 along the stacking direction D.

The fan-out redistribution layer 40 electrically couples the photonic integrated circuit 20 and the electronic integrated circuit 30. Further, the fan-out redistribution layer 40 may include interconnections 410 connected to the photonic integrated circuit 20, so that each interconnection 410 forms a conductive path. Similarly, the fan-out redistribution layer 40 may further include interconnections 420 connected to the electronic integrated circuit 30, so that each interconnection 420 forms a conductive path. Each of the interconnections 410, 420 may include at least one of a line, a conductive via, and a metal pad. The number of the conductive paths between the fan-out redistribution layer 40 and the photonic integrated circuit 20 (i.e. the number of interconnections 410) is less than the number of conductive paths between the fan-out redistribution layer 40 and the electronic integrated circuit 30 (i.e. the number of interconnections 420).

The optical module packaging structure 1 of this embodiment further includes an embedded interposer carrier board 50 disposed in the molding compound layer 10. The electronic integrated circuit 30 is electrically coupled to the embedded interposer carrier board 50. Further, the embedded interposer carrier board 50 is electrically coupled to the electronic integrated circuit 30 via the fan-out redistribution layer 40. The embedded interposer carrier board 50 includes a silicon base 510 and a plurality of through silicon vias (TSVs) formed on the silicon base 510. The said through silicon via may include a through silicon via 521 connected to the electronic integrated circuit 30.

The optical module packaging structure 1 of this embodiment further includes a microcontroller unit (MCU) 60. The microcontroller unit 60 is disposed on the fan-out redistribution layer 40, and the embedded interposer carrier board 50 electrically couples the microcontroller unit 60 and the electronic integrated circuit 30. The plurality of through silicon vias of the embedded interposer carrier board 50 includes through silicon vias 522 connected to the microcontroller unit 60. The number of through silicon vias 522 is greater than the number of through silicon via 521. The electrical coupling between the microcontroller unit 60 and the through silicon via 522 may be realized by wire bonding. A protective cover 61 may be additionally provided to cover the microcontroller unit 60 to provide airtightness. The microcontroller unit 60 may include a central processing unit (CPU), a memory (RAM), and input/output (I/O) interfaces integrated into a single chip.

The optical module packaging structure 1 of this embodiment further includes a memory chip 70, and the memory chip 70 is disposed on the fan-out redistribution layer 40. The memory chip 70 may be a flash memory.

The optical module packaging structure 1 of this embodiment further includes a switching component 80 electrically coupled to the microcontroller unit 60 and the memory chip 70. The switching component 80 is disposed in the molding compound layer 10, and the switching component 80 is electrically coupled to the embedded interposer carrier board 50. Further, the embedded interposer carrier board 50 and the switching component 80 are formed on the same layer. That is, both the embedded interposer carrier board 50 and the switching component 80 are disposed in the molding compound layer 10 and located at the same level or altitude. The switching component 80 is electrically coupled to the embedded interposer carrier board 50 via the fan-out redistribution layer 40. The switching component 80 may be a single chip including one or more switch circuits.

Figure 2:
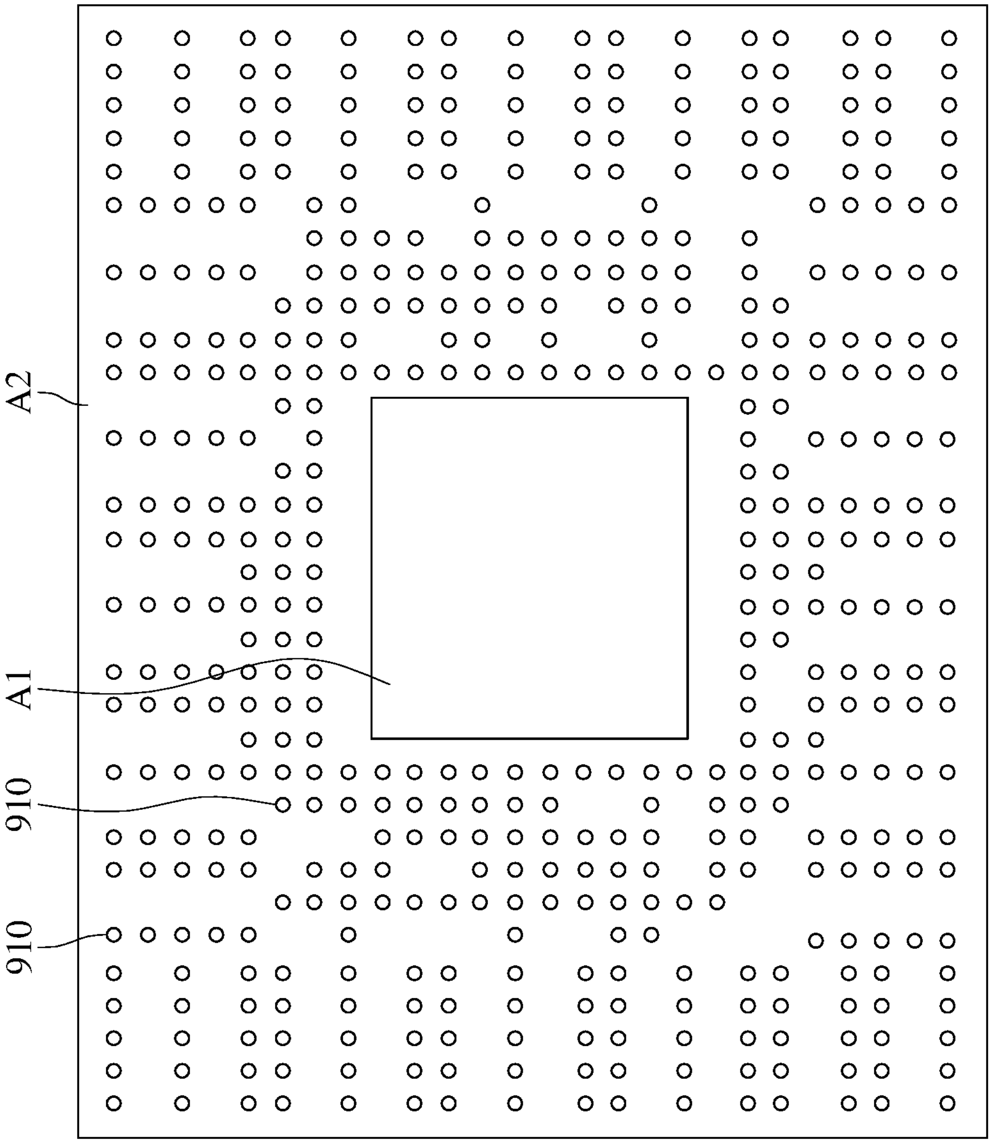
FIG. 2 is a schematic top view of a cross-section of the optical module packaging structure taken along line 2-2 in FIG. 1.

The optical module packaging structure 1 of this embodiment further includes a through molding via array 90 disposed in the molding compound layer 10. Please also refer to FIG. 2. FIG. 2 is a schematic top view of a cross-section taken along line 2-2 of the optical module packaging structure 1 in FIG. 1. The cross-section shown in FIG. 2 may be understood as the cross-section of the molding compound layer 10 in FIG. 1. From the top view in FIG. 2, the optical module packaging structure 1 has a component area A1 and a line area A2 surrounding the component area A1. The embedded interposer carrier board 50 and the switching component 80 are located in the component area A1. The through molding via array 90 is located in the line area A2 and is located outside the component area A1. The through molding via array 90 includes a plurality of through molding vias (TMVs) 910. A part of the through molding vias 910 is/are electrically coupled to the electronic integrated circuit 30, and the remaining through molding via(s) 910 is/are electrically coupled to the memory chip 70.

Figure 3:
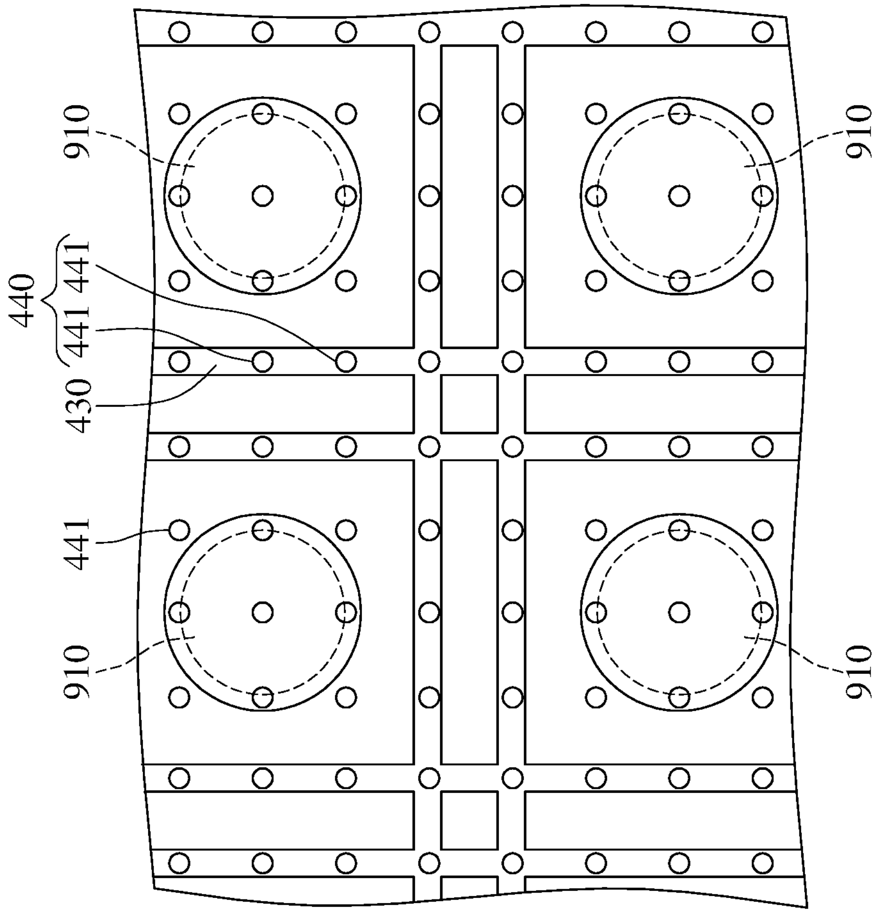
FIG. 3 is a schematic top view of a cross-section of the optical module packaging structure taken along line 3-3 in FIG. 1.

The optical module packaging structure 1 of this embodiment further includes a redistribution layer 41. Please also refer to FIG. 3. FIG. 3 is a schematic top view of a cross-section taken along line 3-3 of the optical module packaging structure 1 in FIG. 1. The cross-section of FIG. 3 may be understood as the cross-section of the redistribution layer 41 in FIG. 1. The fan-out redistribution layer 40 and the redistribution layer 41 are located on two opposite sides of the molding compound layer 10, respectively. The redistribution layer 41 is electrically coupled to the embedded interposer carrier board 50 and the switching component 80, and the redistribution layer 41 is electrically coupled to the electronic integrated circuit 30 and the memory chip 70 via the through molding via array 90. The redistribution layer 41 includes a line 430 and a conductive via array 440. Also, the conductive via array 440 includes at least two conductive vias 441 connected to the line 430. More specifically, the redistribution layer 41 may include a plurality of circuit layers that are stacked, and at least one circuit layer may include several lines 430 and several conductive vias 441, with each line 430 corresponding to multiple conductive vias 441 therein.

The optical module packaging structure 1 of this embodiment may be disposed on a substrate 3. Further, the substrate 3 is, for example, a printed circuit board. The redistribution layer 41 may be electrically coupled to the circuits of the substrate 3, thereby realizing the signal transmission between the electronic integrated circuit 30, the microcontroller unit 60, and the memory chip 70 and substrate 3.

Figure 4:
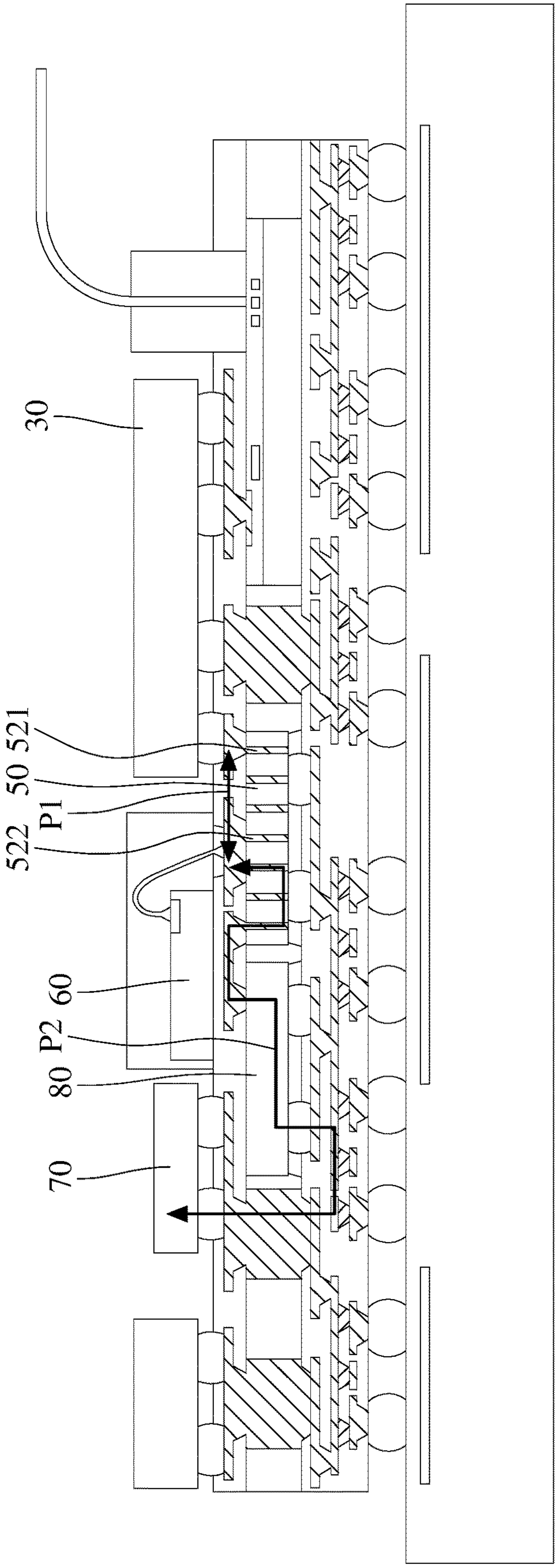
FIG. 4 is a schematic view of a signal transmission path of the optical module packaging structure in FIG. 1.

According to the optical module packaging structure 1 of this embodiment, the switching component 80 adjusts the signal transmission path of the embedded interposer carrier board 50. Further, the switching component 80 may adjust the number of the through silicon vias 522 of the embedded interposer carrier board 50 that are turned on according to the requirement of the bandwidth for signal transmission. Please refer to FIG. 4. FIG. 4 is a schematic view of a signal transmission path of the optical module packaging structure 1 in FIG. 1. The signal transmission path associated with the embedded interposer carrier board 50 includes a signal transmission path P1 between the electronic integrated circuit 30 and the microcontroller unit 60 and a signal transmission path P2 between the memory chip 70 and the microcontroller unit 60. The microcontroller unit 60 is configured to receive the electrical signals from the electronic integrated circuit 30 to set the operating parameters of the components, and the memory chip 70 is configured to store the aforementioned operating parameters. According to the requirement of the bandwidth for signal transmission, at least a portion of the through silicon vias 521, 522 may be turned on or turned off by the switching component 80.

According to the optical module packaging structure 1 of this embodiment, the fan-out redistribution layer 40 electrically couples the photonic integrated circuit 20 and the electronic integrated circuit 30. The electrical signals generated by the photonic integrated circuit 20 are fanned out to the electronic integrated circuit 30, which facilitates the shortening of the signal transmission path, the reduction of the form factor of the packaging structure, and the reduction of the RC delay effect, thereby increasing the efficiency of signal transmission, reducing the insertion loss, and increasing the optical transmission bandwidth.

According to the optical module packaging structure 1 of this embodiment, the embedded interposer carrier board 50 electrically couples the microcontroller unit 60 and the electronic integrated circuit 30. By using the embedded interposer carrier board 50 as a bridge circuit, the through silicon vias 521, 522 therein may increase the signal transmission speed, thereby realizing a high-speed signal transmission between the electronic integrated circuit 30 and the microcontroller unit 60.

According to the optical module packaging structure 1 of this embodiment, the area for the through molding via array 90 is different from the area for the embedded interposer carrier board 50 and the switching component 80. For example, the through molding via array 90 is disposed in the line area A2 in FIG. 2, while the embedded interposer carrier board 50 and the switching component 80 are disposed in the component area A1 in FIG. 2. Thus, a space in the molding compound layer 10 may be saved for embedding the photonic integrated circuit 20, the embedded interposer carrier board 50, and the switching component 80, which facilitates the reduction of the parasitic capacitance and the reduction of the insertion loss, thereby optimizing the impedance of the optical module packaging structure 1. In addition, as shown in FIG. 1 and FIG. 2, since the through molding via array 90 is disposed throughout the line area A2, the through molding vias 910 are disposed at any position in the line area A2 to be electrically coupled to the electronic integrated circuit 30 or the memory chip 70. In this way, when designing the arrangement of the components of the optical module packaging structure 1, the components, such as the electronic integrated circuit 30 and the memory chip 70, may be disposed at any position in the line area A2, which facilitates to the increase of the process yield and the reduction of the manufacturing cost.

According to the optical module packaging structure 1 of this embodiment, at least one line 430 of the redistribution layer 41 corresponds to a plurality of conductive vias 441. In this way, the line 430 is connected to the plurality of conductive vias 441 instead of a single conductive via 441, and thus the line 430 is allowed to carry a high-current load.

Figure 5:
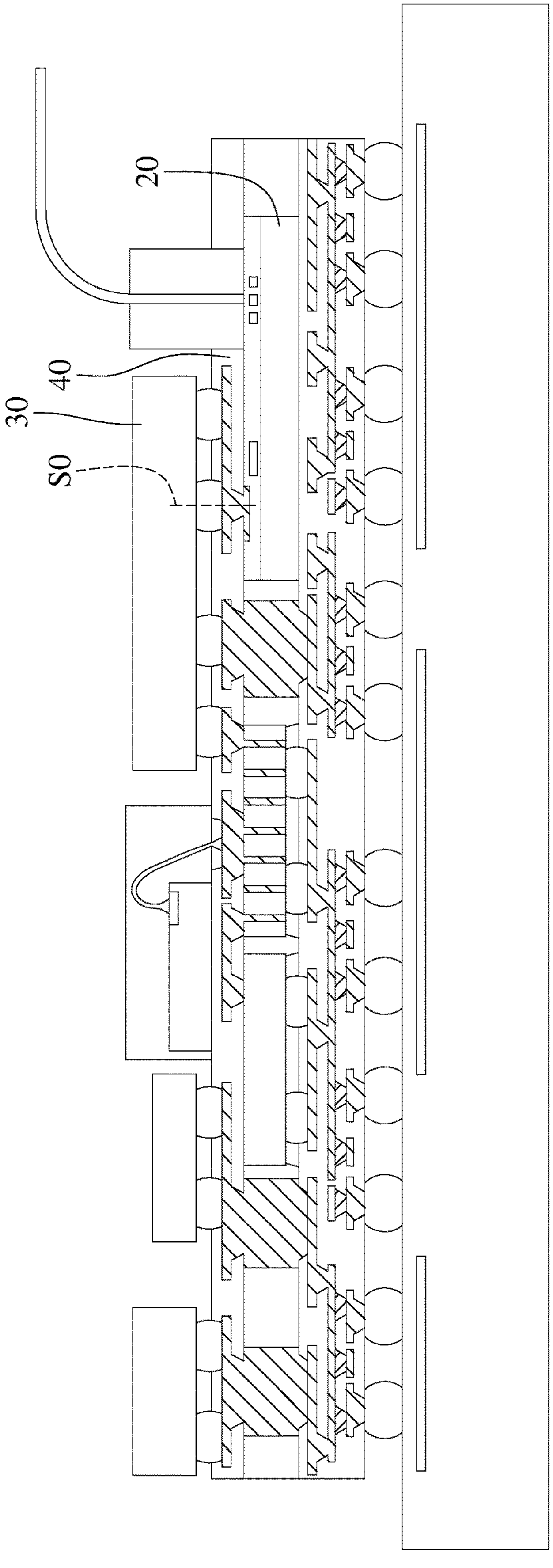
FIGS. 5 to 9 illustrate the insertion loss and the return loss of the optical module packaging structure in FIG. 1.
Figure 6:
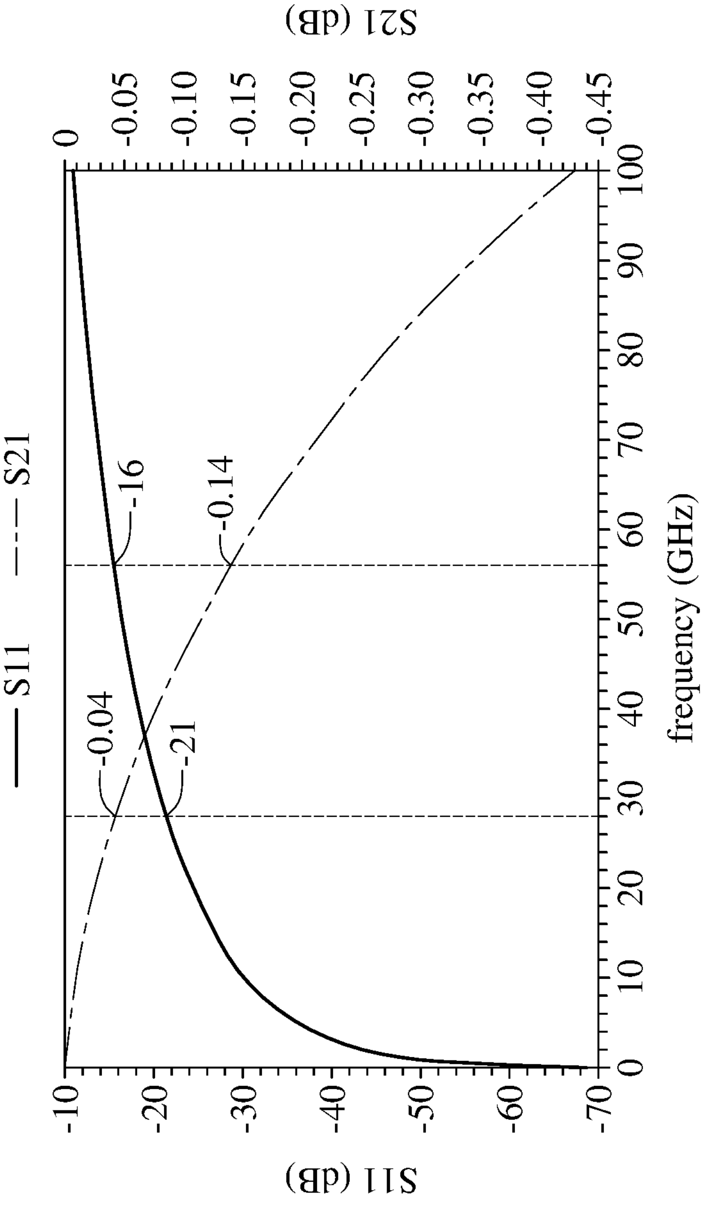

FIGS. 5 to 9 illustrate the insertion loss and the return loss of the optical module packaging structure 1 in FIG. 1. As shown in FIG. 5, the insertion loss and the return loss are measured for the signal transmission path S0 between the photonic integrated circuit 20 and electronic integrated circuit 30 to verify the effect of reducing the loss provided by the fan-out redistribution layer 40. As shown in FIG. 6, in the application of high frequency transmission whose frequency ranges from 30 GHz to 55 GHz as known by the current industry, the insertion loss (S21) may be reduced to a range from −0.04 decibels (dB) to −0.14 dB, and the return loss (S11) may be reduced to a range from −16 dB to −21 dB.

Figure 7:
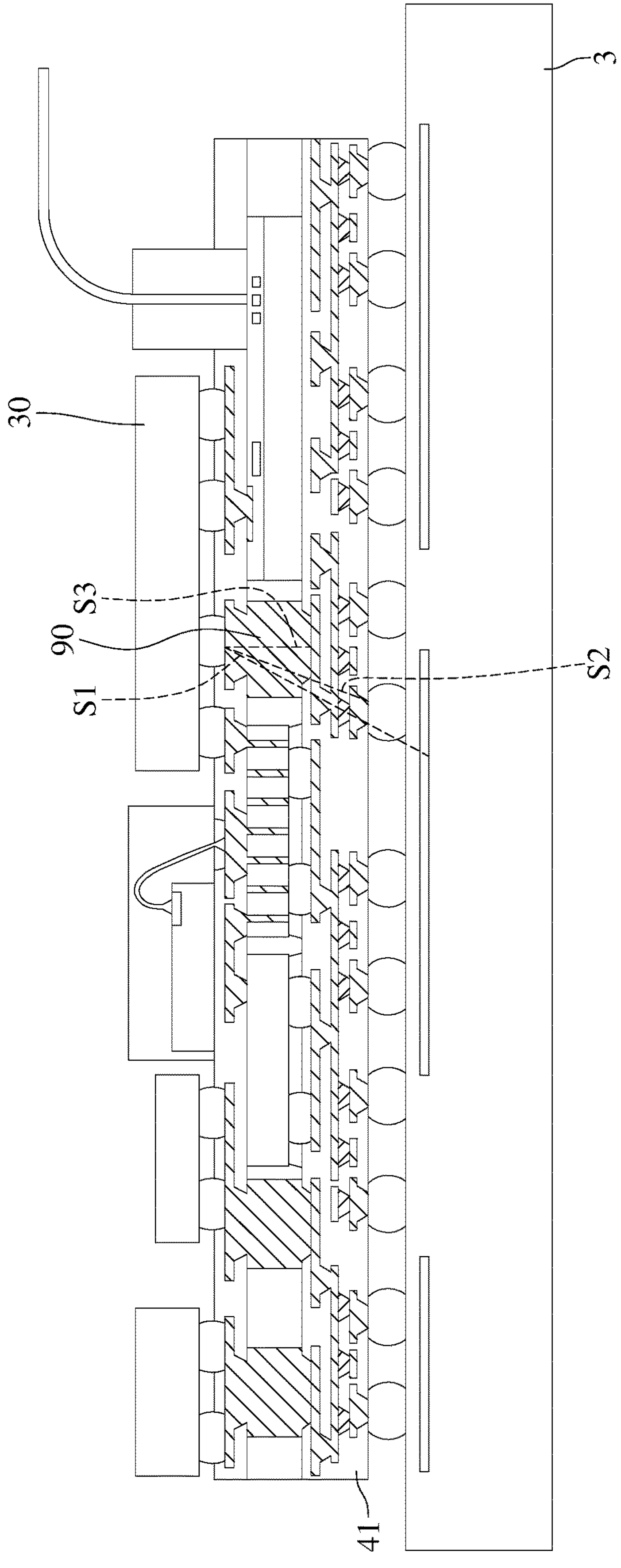

Also, as shown in FIG. 7, the insertion losses and the return losses are measured respectively for the signal transmission path S1 between the electronic integrated circuit 30 and the substrate 3, the signal transmission path S2 between the electronic integrated circuit 30 and the redistribution layer 41, and the signal transmission path S3 between the electronic integrated circuit 30 and the through molding via array 90 to verify the effect of reducing the loss provided by the through molding via array 90.

Figure 8:
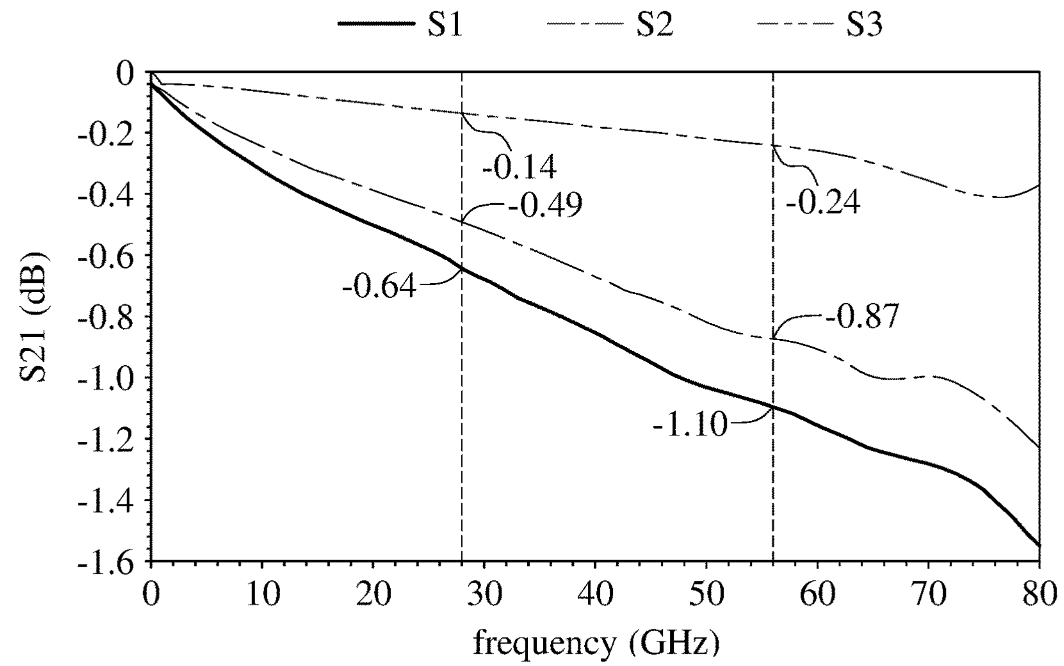

As shown in FIG. 8, in the application of high frequency transmission whose frequency ranges from 30 GHz to 55 GHz as known by the current industry, the insertion loss (S21) of the signal transmission path S1 may be reduced to a range from −0.64 dB to −1.10 dB, the insertion loss of the signal transmission path S2 may be reduced to a range from −0.49 dB to −0.87 dB, and the insertion loss of the signal transmission path S3 may be reduced to a range from −0.14 dB to −0.24 dB.

Figure 9:
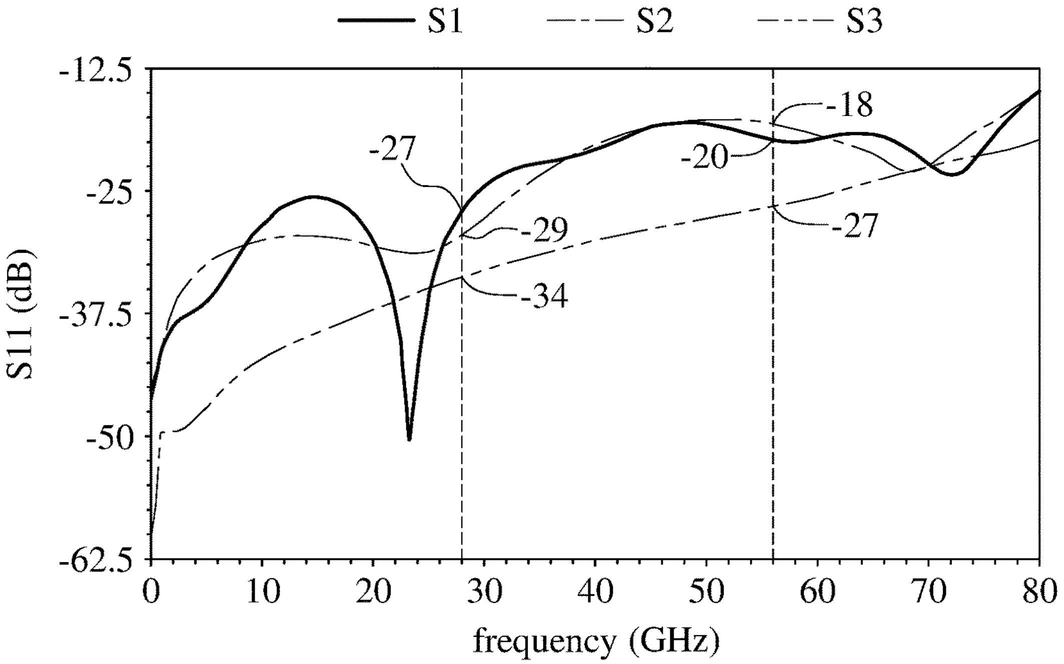

As shown in FIG. 9, in the application of high frequency transmission whose frequency ranges from 30 GHz to 55 GHz as known by the current industry, the return loss (S11) of the signal transmission path S1 may be reduced to a range from −20 dB to −27 dB, the return loss of the signal transmission path S2 may be reduced to a range from −18 dB to −29 dB, and the return loss of the signal transmission path S3 may be reduced to a range from −27 dB to −34 dB.

In summary, according to the optical module packaging structure disclosed by the present disclosure, the fan-out redistribution layer electrically couples the photonic integrated circuit and the electronic integrated circuit. The electrical signals generated by the photonic integrated circuit are fanned out to the electronic integrated circuit, which contributes to shortening the signal transmission path, reducing the form factor of the packaging structure, and reducing the RC delay effect, thereby increasing the efficiency of signal transmission, reducing the insertion loss, and increasing the optical transmission bandwidth.

In addition, by using the embedded interposer carrier board as a bridge circuit, the through silicon vias therein may increase the signal transmission speed, thereby allowing a high-speed signal transmission between the electronic integrated circuit and the microcontroller unit.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An optical module packaging structure, comprising:

a molding compound layer;

a photonic integrated circuit, disposed in the molding compound layer;

a fan-out redistribution layer, disposed on the molding compound layer; an electronic integrated circuit, disposed on the fan-out redistribution layer, the fan-out redistribution layer electrically coupling the photonic integrated circuit and the electronic integrated circuit;

a microcontroller unit disposed on the fan-out redistribution layer, a memory chip disposed on the fan-out redistribution layer, an embedded interposer carrier board disposed in the molding compound layer, and a switching component disposed in the molding compound layer and electrically coupled to the microcontroller unit and the memory chip, wherein the switching component is electrically coupled to the embedded interposer carrier board and configured to turn on vias of the embedded interposer carrier board and thereby adjust a signal transmission path through the embedded interposer carrier board.

2. The optical module packaging structure according to claim 1, wherein a first number of at least one conductive path between the fan-out redistribution layer and the photonic integrated circuit is less than a second number of at least one conductive path between the fan-out redistribution layer and the electronic integrated circuit.

3. The optical module packaging structure according to claim 1, wherein the electronic integrated circuit is electrically coupled to the embedded interposer carrier board.

4. The optical module packaging structure according to claim 3, wherein the embedded interposer carrier board electrically couples the microcontroller unit and the electronic integrated circuit.

5. The optical module packaging structure according to claim 4, wherein the embedded interposer carrier board comprises a plurality of through silicon vias, the plurality of through silicon vias comprises a plurality of first through silicon vias connected to the microcontroller unit and a plurality of second through silicon vias connected to the electronic integrated circuit, and a first number of the plurality of first through silicon vias is greater than a second number of the plurality of second through silicon vias.

6. The optical module packaging structure according to claim 4, further comprising a through molding via array disposed in the molding compound layer, wherein the optical module packaging structure has a component area and a line area surrounding the component area from a top view, the embedded interposer carrier board is located in the component area, and the through molding via array is located in the line area and located outside the component area.

7. The optical module packaging structure according to claim 6, wherein the switching component is located in the component area.

8. The optical module packaging structure according to claim 1, wherein the embedded interposer carrier board and the switching component are formed on a layer.

9. The optical module packaging structure according to claim 1, wherein the molding compound layer and the electronic integrated circuit are disposed sequentially in a stacking direction, and the electronic integrated circuit partially overlaps the photonic integrated circuit along the stacking direction.

10. The optical module packaging structure according to claim 1, further comprising a redistribution layer, wherein the fan-out redistribution layer and the redistribution layer are located on two opposite sides of the molding compound layer, respectively, the redistribution layer is electrically coupled to the electronic integrated circuit, the redistribution layer comprises a line and a conductive via array, and the conductive via array comprises at least two conductive vias connected to the line.

* * * * *